(12) United States Patent
Nair

(10) Patent No.: US 10,929,195 B2
(45) Date of Patent: Feb. 23, 2021

(54) METHOD AND SYSTEM FOR CLOUD VIRTUALIZATION

(71) Applicant: Dynavisor, Inc., Milpitas, CA (US)

(72) Inventor: Sreekumar Nair, San Jose, CA (US)

(73) Assignee: Dynavisor, Inc., Milpitas, CA (US)

( * ) Notice: Subject to any disclaimer, the term of this patent is extended or adjusted under 35 U.S.C. 154(b) by 67 days.

(21) Appl. No.: 16/057,675

(22) Filed: Aug. 7, 2018

(65) Prior Publication Data

US 2019/0042325 A1 Feb. 7, 2019

Related U.S. Application Data

(60) Provisional application No. 62/542,191, filed on Aug. 7, 2017.

(51) Int. Cl.
| | |
|---|---|
| *G06F 9/50* | (2006.01) |
| *H04L 29/08* | (2006.01) |
| *G06F 9/455* | (2018.01) |
| *G06F 11/00* | (2006.01) |
| *H04L 12/26* | (2006.01) |

(52) U.S. Cl.
CPC ........ *G06F 9/5077* (2013.01); *G06F 9/45558* (2013.01); *G06F 9/5072* (2013.01); *G06F 11/00* (2013.01); *H04L 43/0876* (2013.01); *H04L 67/18* (2013.01); *G06F 2009/45562* (2013.01); *G06F 2009/45591* (2013.01); *H04L 67/10* (2013.01)

(58) Field of Classification Search
None
See application file for complete search history.

(56) References Cited

U.S. PATENT DOCUMENTS

| | | | | | |
|---|---|---|---|---|---|
| 5,436,909 | A | * | 7/1995 | Dev | ...................... H04L 41/069 714/4.12 |
| 6,490,620 | B1 | * | 12/2002 | Ditmer | ................ G06F 11/0709 709/224 |
| 2011/0093849 | A1 | * | 4/2011 | Chawla | ............... H04L 41/0816 718/1 |

* cited by examiner

*Primary Examiner* — Craig C Dorais
(74) *Attorney, Agent, or Firm* — Goodwin Procter LLP

(57) ABSTRACT

A system and method for providing cloud virtualization (SV) is disclosed. According to one embodiment, a system includes a transactional cloud manager and a compute cluster connected to the transactional cloud manager. The compute cluster includes a system monitor and a control manager in a host. A virtual machine runs on the host, wherein the virtual machine has a VM system monitor and a VM control manager. The transactional cloud manager creates virtual machine clusters on the host.

17 Claims, 22 Drawing Sheets

Figure 4

| Cluster 10427 | Node 0 | Node 1 | Node 2 | Node 3 |
|---|---|---|---|---|
| Asset # | S0 | S1 | S2 | S3 |
| DC | BLR | BLR | BLR | BLR |
| Room | 1 | 1 | 1 | 1 |
| Row | 2 | 2 | 2 | 2 |
| Rack | 8 | 9 | 10 | 11 |
| Slot | 11 | 11 | 11 | 11 |
| Size | 1 | 1 | 1 | 1 |
| Module | 0 | 0 | 0 | 0 |
| Hardware | HP DL380 | HP DL830 | HP DL380 | HP DL380 |
| MB Serial # | ******** | ******** | ******** | ******** |
| Node Name | Inv12-Host00 | Inv12-Host10 | Inv12-Host00 | Inv12-Host11 |
| Mirror Node | Inv12-Host01 | Inv12-Host11 | Inv12-Host01 | Inv12-Host10 |
| -Host OS | RHEL 7.0 | | | |

400

Show MB Serial # — 440

Servers already assigned to clusters 410

Newly installed servers. Not yet assigned. 420

(DC, Room, Row, Rack) 430

Rack (2,1,2,1) 450

Data Center Table 1520

| DC# | Address | Contact | Rooms |
|---|---|---|---|
| BLR | 0 | 11257 | 3 |
| LND | 0 | 13275 | 2 |

Room Table 1530

| DC# | Room# | Rows | RacksPerRow | SlotsPerRack |
|---|---|---|---|---|
| BLR | 0 | 10 | 6 | 40 |
| BLR | 1 | 6 | 6 | 40 |
| BLR | 2 | 8 | 6 | 40 |

Asset Table 1540

| Asset# | DC | Room | Row | Rack | Slot | RU | HostPerServ | Hardware | MB Serial# |
|---|---|---|---|---|---|---|---|---|---|
| S0 | 0 | 1 | 3 | 4 | 0 | 1 | 1 | HP DL380 | ********* |
| S1 | 0 | 1 | 3 | 5 | 0 | 1 | 1 | HP DL380 | ********* |

Project Template Table (ProjectTemplates) 1710

| Template | CompClusGroupTemp | StorClusGroupTemp | NetClusGroupTemp |
|---|---|---|---|
| TEMP-P0 | CCGT-P0 | SCGT-P0 | NCGT-P0 |

Compute Cluster Group Template Table (CompClusGroupTemplates) 1720

| CompClusGroupTemp | CompClusTemp | VMClusTemp |
|---|---|---|
| CCGT-P0 | CCT-P0 | VMCT-P0 |

Compute Cluster Template Table (CompClusTemplates) – Level 0 (V0) 1730

| CompClusTemp | HostName | NumMirrors | NodesPerCluster | MaxVMClus | OS |
|---|---|---|---|---|---|
| CCT-P0 | %C%-Host%N%%M% | 2 | 4 | 6 | RHEL 7.0 |

VM Cluster Template Table (VMClusTemplates) – Level 1 (V1) 1740

| VMClusTemp | VMName | NumMirrors | CPU | MemGB | OS |
|---|---|---|---|---|---|
| VMCT-P0 | %C%-VM%N%%M% | 2 | 4 | 8 | Ubuntu 16.04 |

| Transaction | Type | HLevel | VLevel | SQLScript | ControlScript |
|---|---|---|---|---|---|
| TRAN-P0 | AddCompCluster | 0 | 1 | AddCompCluster-Inv12.sql | AddCompCluster-Inv12.sql |
| TRAN-P0 | AddCompCluster | 1 | 1 | AddCompCluster-Inv13.sql | AddCompCluster-Inv13.sql |

Project Transaction Table 1810 : Level 0 (V0)

| Transaction | Type | HLevel | VLevel | SQLScript | ControlScript |
|---|---|---|---|---|---|
| TRAN-P0 | AddVMCluster | 0 | 2 | AddVMCluster-Inv12-VM0.sql | AddVMCluster-Inv12-VM0.sh |
| TRAN-P0 | AddVMCluster | 0 | 2 | AddVMCluster-Inv12-VM1.sql | AddVMCluster-Inv12-VM1.sh |
| TRAN-P0 | AddVMCluster | 0 | 2 | AddVMCluster-Inv12-VM2.sql | AddVMCluster-Inv12-VM2.sh |
| TRAN-P0 | AddVMCluster | 0 | 2 | AddVMCluster-Inv12-VM3.sql | AddVMCluster-Inv12-VM3.sh |
| TRAN-P0 | AddVMCluster | 0 | 2 | AddVMCluster-Inv12-VM4.sql | AddVMCluster-Inv12-VM4.sh |
| TRAN-P0 | AddVMCluster | 0 | 2 | AddVMCluster-Inv12-VM5.sql | AddVMCluster-Inv12-VM5.sh |
| TRAN-P0 | AddVMCluster | 1 | 2 | AddVMCluster-Inv13-VM0.sql | AddVMCluster-Inv13-VM0.sh |
| TRAN-P0 | AddVMCluster | 1 | 2 | AddVMCluster-Inv13-VM1.sql | AddVMCluster-Inv13-VM1.sh |
| TRAN-P0 | AddVMCluster | 1 | 2 | AddVMCluster-Inv13-VM2.sql | AddVMCluster-Inv13-VM2.sh |
| TRAN-P0 | AddVMCluster | 1 | 2 | AddVMCluster-Inv13-VM3.sql | AddVMCluster-Inv13-VM3.sh |
| TRAN-P0 | AddVMCluster | 1 | 2 | AddVMCluster-Inv13-VM4.sql | AddVMCluster-Inv13-VM4.sh |
| TRAN-P0 | AddVMCluster | 1 | 2 | AddVMCluster-Inv13-VM5.sql | AddVMCluster-Inv13-VM5.sh |

Project Transaction Table 1820 : Level 1 (V1)

| CompClus | HostName | Asset# | OS |
|---|---|---|---|
| CC0-P0 | Inv12-Host00 | S0 | RHEL 7.0 |
| CC0-P0 | Inv12-Host10 | S1 | RHEL 7.0 |
| CC0-P0 | Inv12-Host01 | S2 | RHEL 7.0 |
| CC0-P0 | Inv12-Host10 | S3 | RHEL 7.0 |

Compute Cluster Table (CompClusters) – Level 0 (V0)

| VMClus | ActiveGuest | PassiveGuest | ActiveHost | PassiveHost | NumMirrors | CPU | MemGB | GuestOS |
|---|---|---|---|---|---|---|---|---|
| VMC0-P0 | Inv12-VM00 | Inv12-VM01 | Inv12-Host00 | Inv12-Host01 | 2 | 4 | 8 | Ubuntu 16.04 |
| VMC1-P0 | Inv12-VM10 | Inv12-VM11 | Inv12-Host00 | Inv12-Host01 | 2 | 4 | 8 | Ubuntu 16.04 |
| VMC2-P0 | Inv12-VM20 | Inv12-VM21 | Inv12-Host00 | Inv12-Host01 | 2 | 4 | 8 | Ubuntu 16.04 |
| VMC3-P0 | Inv12-VM30 | Inv12-VM31 | Inv12-Host00 | Inv12-Host01 | 2 | 4 | 8 | Ubuntu 16.04 |
| VMC4-P0 | Inv12-VM40 | Inv12-VM41 | Inv12-Host00 | Inv12-Host01 | 2 | 4 | 8 | Ubuntu 16.04 |
| VMC5-P0 | Inv12-VM50 | Inv12-VM51 | Inv12-Host00 | Inv12-Host01 | 2 | 4 | 8 | Ubuntu 16.04 |

VM Cluster Table (VMClusters) – Level 1 (V1)

METHOD AND SYSTEM FOR CLOUD VIRTUALIZATION

The present application claims the benefit of and priority to U.S. Provisional Patent Application Ser. No. 62/542,191 filed on Aug. 7, 2017 and entitled "DYNAMIC CLOUD VIRTUALIZATION," which is hereby incorporated by reference.

FIELD

The present disclosure relates in general to the field of computer software and systems, and in particular, to a system and method for dynamic information virtualization.

BACKGROUND

Information is at the heart of computer applications. Information refers to data emanating from various sources including storage devices, Web resources, application data, instant messages, emails, dynamic objects, etc. Enterprise information virtualization (EIV) allows applications to use information from a variety of sources. An EIV server evaluates requests for information from an information requestor, optimizes and sends queries for the requested information to individual data sources, and delivers and reports query results to the information requestor. The EIV server may also run a custom application and publish the query results on a Web service.

Coherency of information is important when caching information to achieve good performance. Management of information coherency is in many ways akin to cache coherency management in processors. The underlying coherency management for either information management or cache coherency management should account for the followings. First, the unit of coherency is pre-determined. The unit of coherency is usually a block of a convenient size (e.g., one memory page). When multiple computers or applications cache the same information, the coherency protocol ensures that a block of information can at most be modified by one process or one computer at a time. Second, when a process (or computer) intends to write to a block, the process (or computer) first acquires a lock, reads the latest version of the information block from a backing store, and notifies all other processes (or computers) to invalidate the block from their caches. In cache coherency protocols, this process is referred to as read for ownership (RFO). An example of cache coherency protocols is MESI protocol. As long as a process (or computer) holds a RFO lock on a block, the process (or computer) is allowed to write to the block (also referred to as dirty writes). Subsequently, when another process (or computer) requests to read the same block, a cache manager requests the process (or computer) that holds the RFO lock to flush the block to the backing store, and release the RFO lock. Then, the cache manager enables the requesting process to acquire the RFO lock, and cache the block of information for its use.

SUMMARY

A system and method for providing cloud virtualization (SV) is disclosed. According to one embodiment, a system includes a transactional cloud manager and a compute cluster connected to the transactional cloud manager. The compute cluster includes a system monitor and a control manager in a host. A virtual machine runs on the host, wherein the virtual machine has a VM system monitor and a VM control manager. The transactional cloud manager creates virtual machine clusters on the host.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

FIG. 4 illustrates an exemplary cluster interface, according to one embodiment.

FIG. 15 illustrates and exemplary asset management database, according to one embodiment.

FIG. 17 illustrates an exemplary project template database, according to one embodiment.

FIG. 18 illustrates an exemplary project transaction table, according to one embodiment.

FIG. 19 illustrates an exemplary project transaction database, according to one embodiment.

Figure 1:
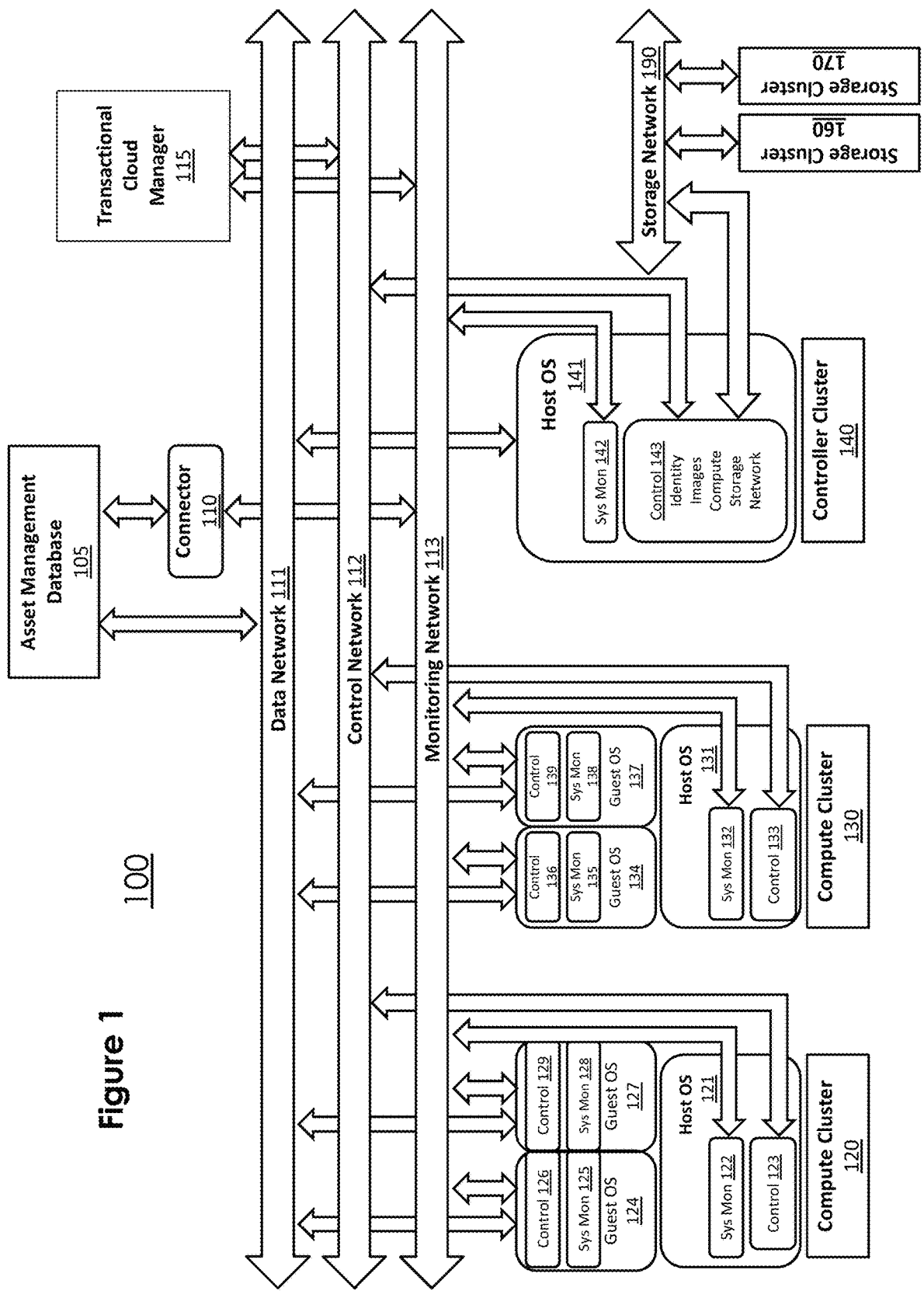
FIG. 1 illustrates an exemplary system architecture including a transactional cloud manager 115, according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A system and method for providing cloud virtualization (SV) is disclosed. According to one embodiment, a system includes a transactional cloud manager and a compute cluster connected to the transactional cloud manager. The compute cluster includes a system monitor and a control manager in a host. A virtual machine runs on the host, wherein the virtual machine has a VM system monitor and a VM control manager. The transactional cloud manager creates virtual machine clusters on the host.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present system provides a new user experience for cloud management. Dynamic cloud virtualization (DCV) abstracts and virtualizes the data center and the cloud thereby facilitating the efficient and profitable management thereof using a rich assortment of features including but not restricted to:

1. Global Cloud Management: Facilitates administrators of data centers and clouds to get a bird's eye view of the health and vital statistics of the computer installations across multiple geographical location (geo locations) around the world, to be alerted of data center issues instantly via intelligent data center monitoring techniques, and to instantly zoom in and resolve problems.
2. Click-Ahead Operations: Normally data center operations like creation and management of compute, storage, or virtual machine clusters require a lot of iterative operations with tedious waits for many sequential operations to complete before progressing to next operations. The Click-Ahead feature of DCV permits the administrators to speculative complete these operations fast and move ahead without waiting for the operations to complete. If any failure does occur, DCV automatically tries to figure out solutions, and notifies the administrators to revisit the operation with specific recommendations to resolve the problems.
3. One-Click Operations: DCV permits the administrators to predefine templates for multiple control variables for operations like creating and managing compute, storage, and virtual machine clusters. Depending on this predefined configurations, adaptive learning, and intelligent predictive analysis, DCV is able to predict what the administrator wishes to do next and presents recommendations for suggested configurations which in most cases would closely match the administrators' requirements that they may be simply confirm the recommendation with a single click and complete the operation.
4. Direct Zoom: The DCV configurations are managed on a per-user basis, completely personalized and customized for each administrator to suit his or her work profiles and roles. This helps each administrator to zoom in on the next operation depending on historical information about his or her recent activities, coupled with predictive analysis based on recent data center activities (like installation of new servers, pending notifications, etc.).
5. Cloud Manager Agnostic: DCV does not assume or require the services of any specific cloud manager infrastructure like Openstack, VMware vCenter, Citrix XenCenter, etc. DCV defines transparent API's for specific chores which can be rendered using interfaces of the cloud manager deployed in the data center. TCM below primarily relies on Openstack cloud manager, but DCV can work with other commercial cloud managers as well.

FIG. 1 illustrates an exemplary system architecture 100 including a transactional cloud manager 115, according to one embodiment. System 100 includes a transactional cloud manager 115 that is connected to control network 112 and monitoring network 113. Asset management database 105 may also be a human resources database connected to data network 111 and monitoring network 113 through connector 110. System 100 may be a data center, according to one embodiment. System 100 includes storage clusters 160 and 170 that connect to storage network 190. A controller cluster 140 has a host operating system 141, a system monitor 142, and a control manager 143, which manages identity, images, compute, storage and network access, configuration and functionality. Controller cluster connects to control network 112 and monitoring network 113.

System 100 has compute clusters 120 and 130 running virtual environments. Compute cluster 120 has virtual machines 124 and 127, and compute cluster 130 has virtual machines 134 and 137. The virtual machines 124, 127, 134, and 137 communicate with monitoring network 113 and data network 111. Virtual machines 124, 127, 134, 137 have system monitor 125, 128, 135, 138 (respectively), and control manager 126, 129, 136, 139 (respectively). Compute cluster 120 has a host operating system 121, a system monitor 122, and a control manager 123 and communicates with control network 112 and monitoring network 113. Compute cluster 130 has a host operating system 131, a system monitor 132, and a control manager 133 and communicates with control network 112 and monitoring network 113.

Transactional cloud manager 115 is one embodiment of a dynamic cloud virtualization. The present transactional cloud manager (TCM) 115 is a data center management tool that provides a number of graphical user interfaces. TCM 115 helps administrators of data centers and clouds get a bird's eye view of the health and vital statistics of the computer installations (e.g., compute clusters 120, 130, etc.), to be alerted of data center (e.g., system 100) issues via intelligent data center monitoring processes, and to zoom in and resolve problems (e.g., with one-click resolution processes). TCM 115 also facilitates the fast ramp up and efficient maintenance of data center infrastructures using processes for installation, modification, deletion, snapshotting, cloning, updating, power management, and suspend/resume of physical and virtual servers in data centers and clouds.

In one embodiment, TCM 115 blends the versatility of Openstack to simplify operations that with prior systems require multiple iterations spanning multiple webpages and screen sessions. With the present system 100, these operations can be completed using a single click. TCM 115 adapts to the configuration trends of the data center components and provides intelligent recommendations for the configurations of compute clusters 120, 130; storage clusters 160, 170; and network 140 clusters.

TCM 115 helps administrators manage large data centers and clouds via the orchestration of three components:

1. Openstack: Distributed across the compute and controller nodes, Openstack components are responsible for services like identity management (keystone), image management (glance), virtual instance or compute management (nova), block storage management (cinder), management of network in general and software defined networking (SDN) in particular (neutron). Other Openstack services are also beneficial and used in TCM, but TCM tries to maintain a rigorous balance between the versatility of Openstack architecture arising from its profound capabilities, and the efficiency of operations guaranteed by simplicity of design.

2. System Monitor: Clients running on the host (e.g. 122) as well as virtual machines (e.g., 125, 128) periodically collect vital statistics of the system as well as detailed operational records of torrent optimizations and send them to the cloud manager server 115 for in-motion as well as offline intelligent analytics to detect any strain or inefficiency of the data center infrastructure. The present system monitor 122 is also instrumental in effecting the handshakes between the compute 125, 128 and controller 140 nodes to TCM 115 and establishing control channels to facilitate TCM 115 to efficiently manage operations on these nodes including management of virtual instances, block storage, and network infrastructures.

3. Transactional Cloud Manager 115: provides user interfaces to manage thousands of compute clusters (e.g., 120, 130), storage clusters (e.g., 160, 170), and network components, binds in the convenience of predictive resource management with simple click-ahead operations which allows the system to speculatively move ahead without having to wait for the entire operations to complete.

Torrent and TCM are live installed in the compute clusters and virtual instances as part of planned patch management in the data center 100 without requiring special down time or maintenance overhead. Once installed, the system monitor (e.g. 122, 132) connects to the cloud manager server 115 using predetermined network interfaces and establishes channels for the cloud manager server 115 to control and monitor the hosts (e.g., 121, 131) and the virtual machines (e.g., 124, 127, 134, 137).

The hosts (e.g., 121, 131) and guests (e.g., 124, 127, 134, 137) are identified by predetermined keys (e.g., system motherboard serial number or virtual machine UUID) using information queried from the data center's asset management database 105 using a connector 110 (e.g., Torrent secure connector). TCM 115 utilizes information in the asset management database 105, when available, to give detailed illustrations of a data center. Asset management database 105 includes information for each server in the data center, including the X and Y GPS co-ordinates for each of the computer racks within the data center and where each server is located within the rack. TCM 115 provides room views based on the X and Y GPS co-ordinates for each of the computer racks recorded in the asset management database 105.

Figure 2:
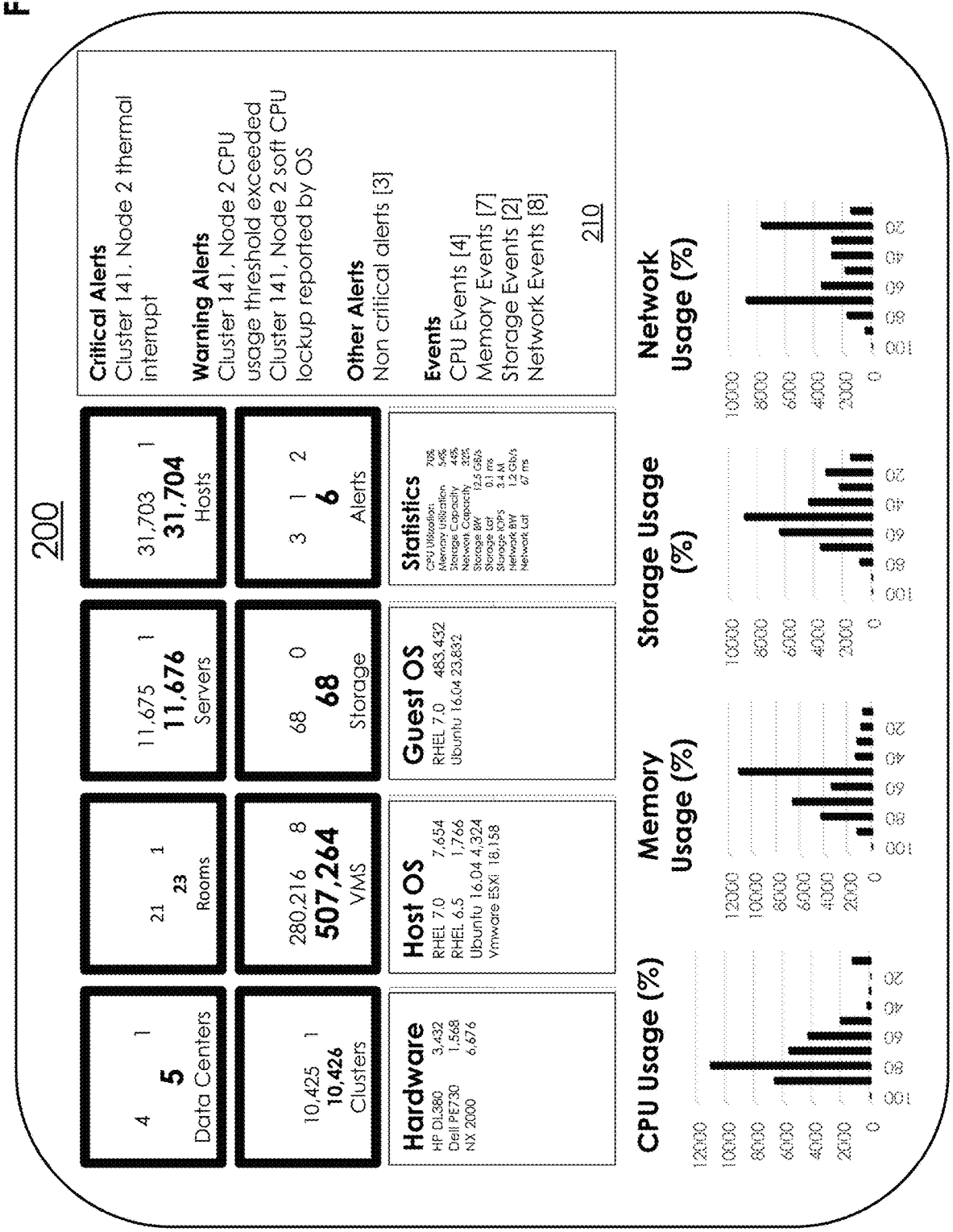
FIG. 2 illustrates an exemplary user interface for data center status, according to one embodiment.

FIG. 2 illustrates an exemplary user interface for data center status 200, according to one embodiment. Data center status interface 200 provides a bird's eye view into the data centers across geographic locations and helps the administrator monitor the instantaneous health and vital statistics of servers and equipment within the data center (e.g., system 100). The data center status interface 200 has configurable widgets that can be placed at convenient locations of the main screen. Widgets of data center status interface 200 may include:

1. Counters for data centers, rooms, servers, hosts, clusters, virtual machines (VMS), and storage: The large counter in the center of a widget (e.g., "5" in the data center widget) indicates the total count, and the counters on the top left of a widget (e.g., "4" in the data center widget) indicate the count of operational components, and the counters on the top right of a widget (e.g., "1" in the data center widget) indicate the number of faulty components. Please note that the sum of operational components and faulty components may not add up to total—some components may be down for scheduled maintenance or may be offline for other planned reasons.

2. Alerts and Notifications: The counter in the center of the alerts widget indicates the total number of alerts (e.g., "6" in the alerts widget), while the three numbers on the top of the widget (e.g., "3 1 2" in the alerts widget) indicate the counts of critical, warning, and informational alerts. The current alerts panel 210 on the right shows the current alerts. Clicking on an alert within current alerts panel 210 opens the appropriate pages where remedial actions can be initiated.

3. Inventory of hardware, host and guest operating systems: These widgets provide a summary of support and service dependencies from external vendors. When a critical alert is raised, or a maintenance deadline is imminent (preventive maintenance or renewal of annual maintenance contract is due), an alert in these widgets help the administrator focus on networking with the external vendors to resolve the problems. An alert can be in the form of a star, highlight, flashing line, etc.

4. Statistics of CPU, memory, storage and network performance: Data center status interface 200 provides a detailed view of multiple matrices that confirms the overall operational efficiency of the data center.

5. Histograms of CPU, memory, storage usage, and network usage: Data center status interface 200 helps an administrator understand the efficiency of the individual computer components in the data center 100 at a high level. In this example, these widgets indicate that the CPU usage is in the range 80%, memory usage is in the range of 60%, storage usage is in the range of 50%, and network is not grossly peaked on any system—these are all healthy indicators—however, it can be also be observed that a handful of machines (physical or virtual servers) have over 100% CPU activity or memory usage—this is a warning for the administrator to closely monitor these servers for a potential disturbance in their efficiency.

Figure 3:
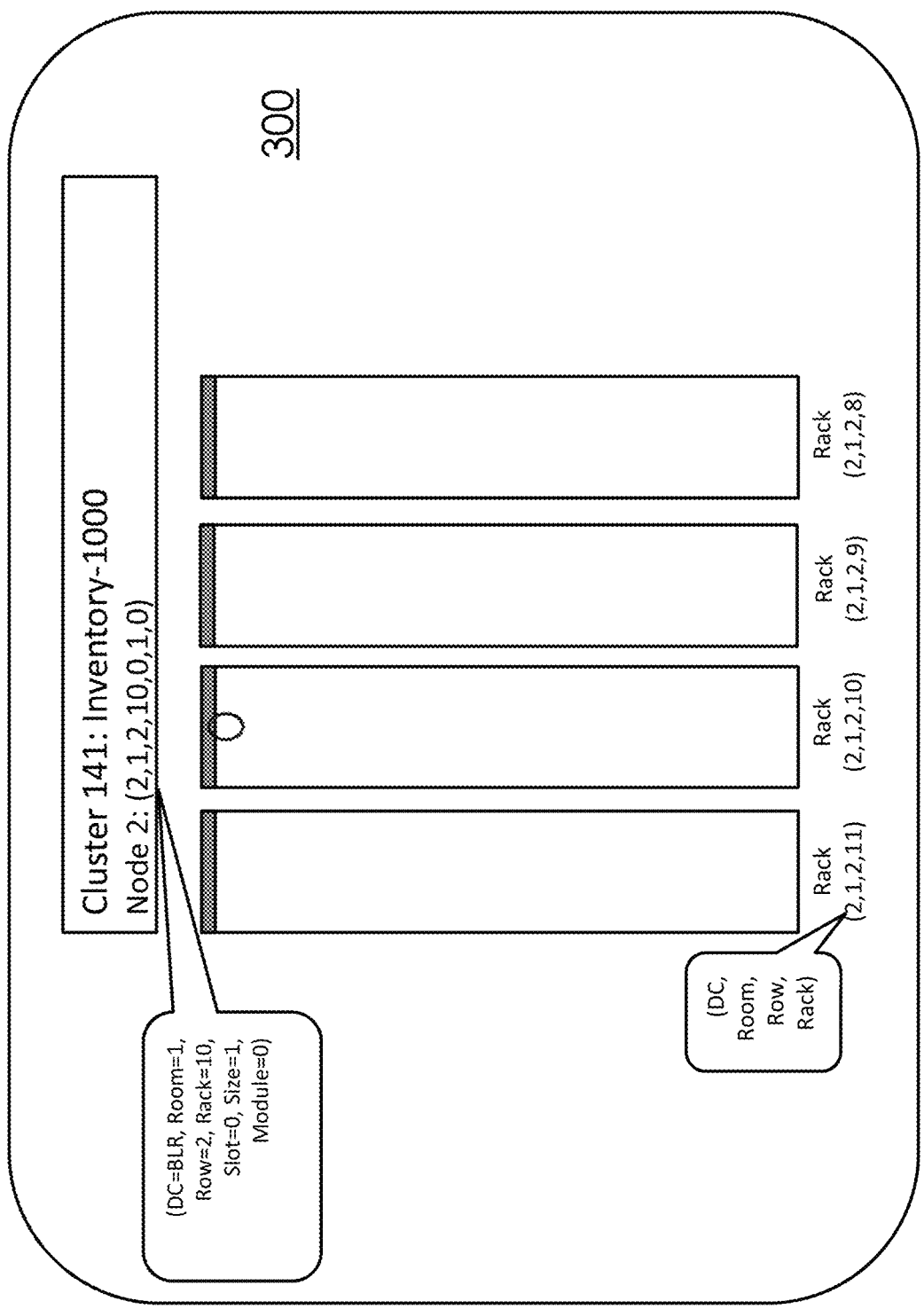
FIG. 3 illustrates an exemplary alert interface, according to one embodiment.

Data center status interface 200 is configurable to suit the work profiles and roles of an administrator. For example, once an alert is detected, the administrator may click on the alert to take him directly to the page where a remedial action can be performed—e.g., to the rack containing the server that raised the alert. FIG. 3 illustrates an exemplary alert interface 300, according to one embodiment. In the example of alert interface 300, TCM 115 alerts the administrator that there is a problem with a server in data center 2, room 1, row 2, and rack 10. The alert further indicates that the server is in slot 1, has a size of 1 unit and the problem is with module 0 on the motherboard. A circle graphically indicates where the motherboard is located on the rack.

Data center status interface 200 allows an administrator to configure a series of prompts to walk him through geographic locations illustrations (e.g., a map of the world that pinpoints the street address and provides a phone number for the data center) and data center illustrations (e.g., an illustration of the room where the server is located with a pinpoint location of the server within the room) to get additional information to initiate other actions—e.g., to delegate the resolution to a local administrator in the particular geographical location.

Data center status interface 200 provides links to various pages to perform administration of various components of the data center—compute clusters (e.g., 120, 130); virtual machines (e.g., 124, 127, 134, 137); network (e.g., 140) and storage devices (e.g., 160, 170). According to one embodiment, once a user clicks on these links to perform the addition or modification of these components, TCM 115 guides her through a geographic location view and data center view to help her land at the correct clusters on which to operate.

TCM configurations can be set to perform additions and modifications of these components—especially if the user is performing repetitive operations like configuring clusters on one thousand newly installed compute servers. TCM 115 stores the last operation for each administrator (session based activity tracking) and when an administrator clicks on one of the links (e.g., compute clusters (e.g., 120, 130); virtual machines (e.g., 124, 127, 134, 137); network (e.g., 140) and storage devices (e.g., 160, 170)), the control automatically transfers to the page corresponding to the last clusters on which she was operating.

Clusters

According to one embodiment, TCM 115 maintains the following compute cluster (e.g., compute clusters 120, 130) parameters—how many compute nodes (e.g., nodes 121, 131) to be included in each high available (HA) cluster, how many of them are active and how many are passive, how to share storage and network interfaces across the cluster nodes, and what host operating systems to install on the cluster nodes. The administrator can obtain a cluster view of the data centers by clicking on the clusters widget on data center status interface 200 and navigate down through the geographic location view and data center view to the exact racks containing the cluster nodes that are of interest to the administrator. In another embodiment, clicking on the clusters widget on data center status interface 200 opens an interface showing the last set of cluster nodes she had been configuring so that she can continue her operations on the neighboring nodes in the same sets of racks. This is especially useful when he is building new clusters on a thousand newly installed servers.

To add a new cluster, the administrator clicks on a newly installed server. TCM 115 makes suggestions for how many active/passive nodes, and more precisely which nodes should be configured into the new cluster. FIG. 4 illustrates an exemplary cluster interface 400, according to one embodiment. Cluster interface 400 shows that when a new server is selected, TCM 115 causes the recommended nodes to be highlighted as well as the recommended configuration to be popped up as a table (e.g., Cluster 10427 table 450). If the administrator agrees with the recommendation, the new cluster is created by selecting an add button 440.

Figure 5:
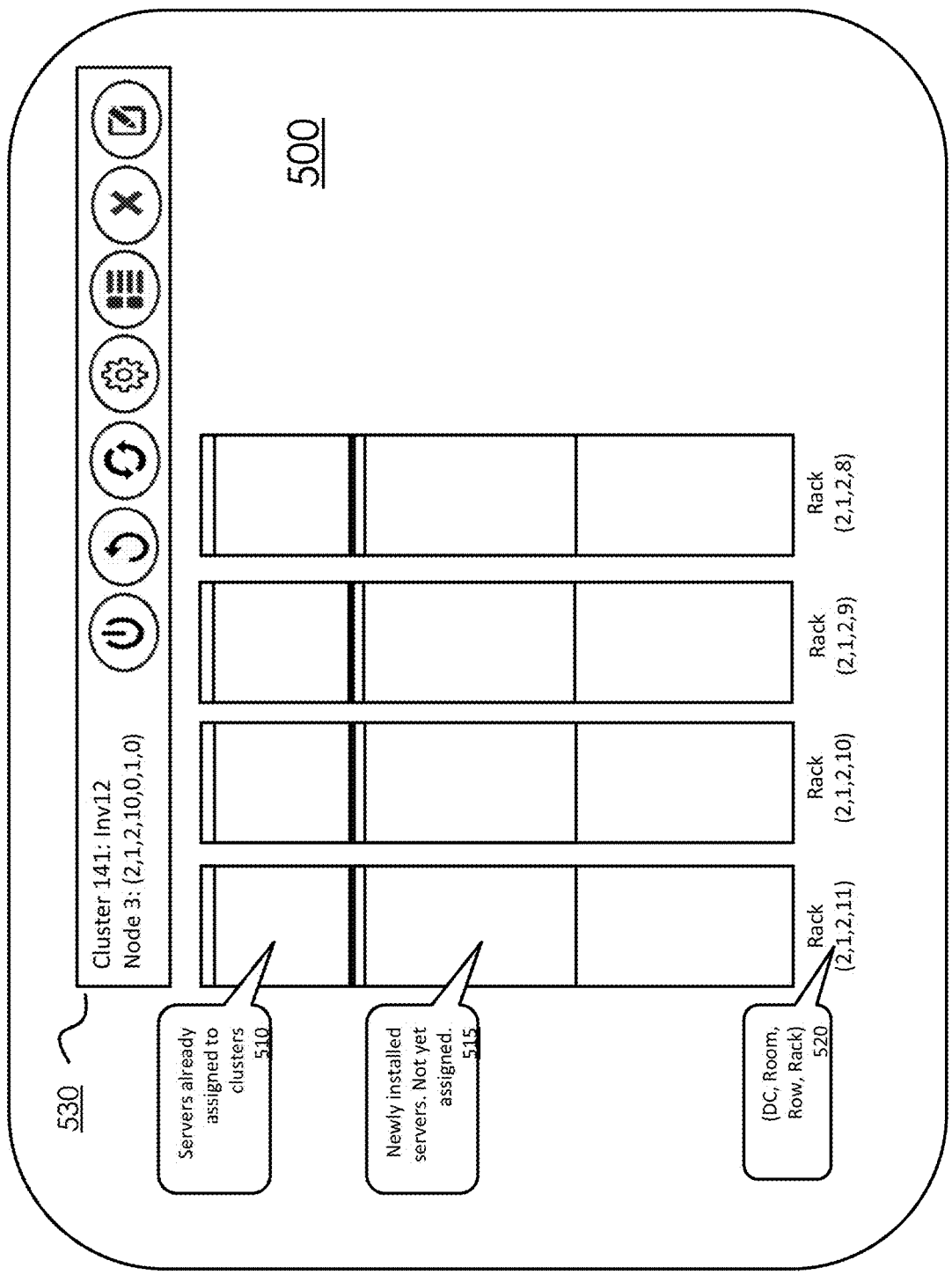
FIG. 5 illustrates an exemplary cluster interface, according to one embodiment.

FIG. 5 illustrates an exemplary cluster interface 500, according to one embodiment. To modify an existing compute cluster, if any of the nodes of the cluster are selected (e.g., clicked), a menu 530 identifies the cluster and node with buttons to perform operations like power on/off, software update, reboot, modify settings, list virtual machines, delete the cluster, or edit the cluster configurations. Cluster interface 500 also shows for each rack in the cluster, the servers already assigned to clusters 510, newly installed servers that are not yet assigned 515, and identify the data center, room, row, and rack 520.

Virtual Machines

Figure 6:
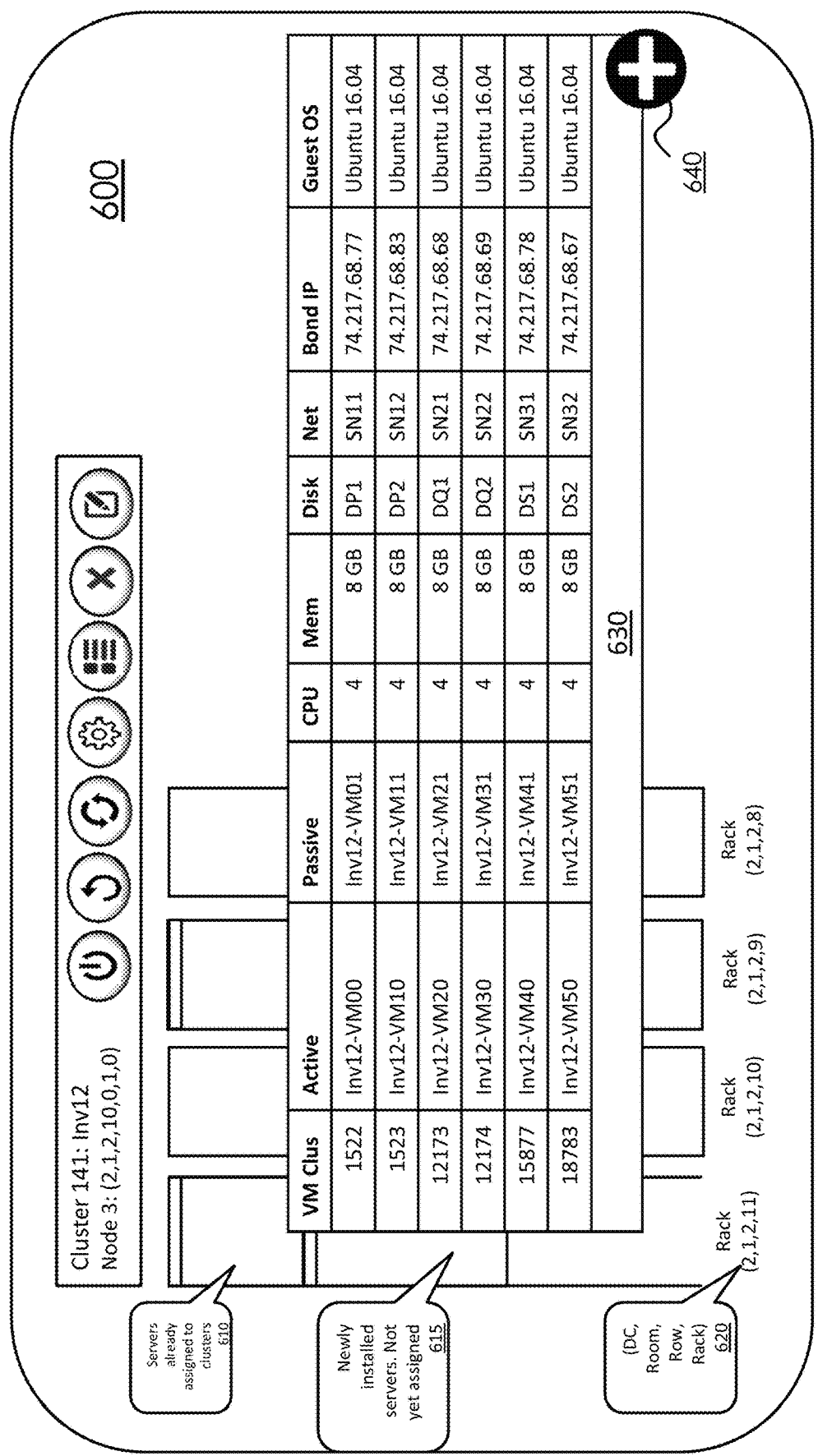
FIG. 6 illustrates an exemplary virtual machine cluster interface, according to one embodiment.

TCM 115 creates, stores, and maintains virtual machine clusters configurations—the configurations include information, such as how many virtual machines to be included in a cluster, how many of these virtual machines are active and how many are passive, how virtual machines are distributed across the host compute clusters, the image template from glance to be used for the virtual machines, etc. FIG. 6 illustrates an exemplary virtual machine cluster interface 600, according to one embodiment. Virtual machine cluster interface 600 appears when the VMS widget of data center status interface 200 is selected. An administrator may directly land on virtual machine cluster interface 600 where he had last been operating, or he may navigate through a geo locations view and data center view to land on the virtual machine cluster interface 600 for the desired compute cluster.

Once in the virtual machine cluster interface 600, TCM 115 allows that a node may be selected, and displays a list of the virtual machine clusters (e.g., "VM Clus" of table 630) installed on the compute cluster. To add a new virtual machine cluster, the administrator selects the add button 640.

Figure 7:
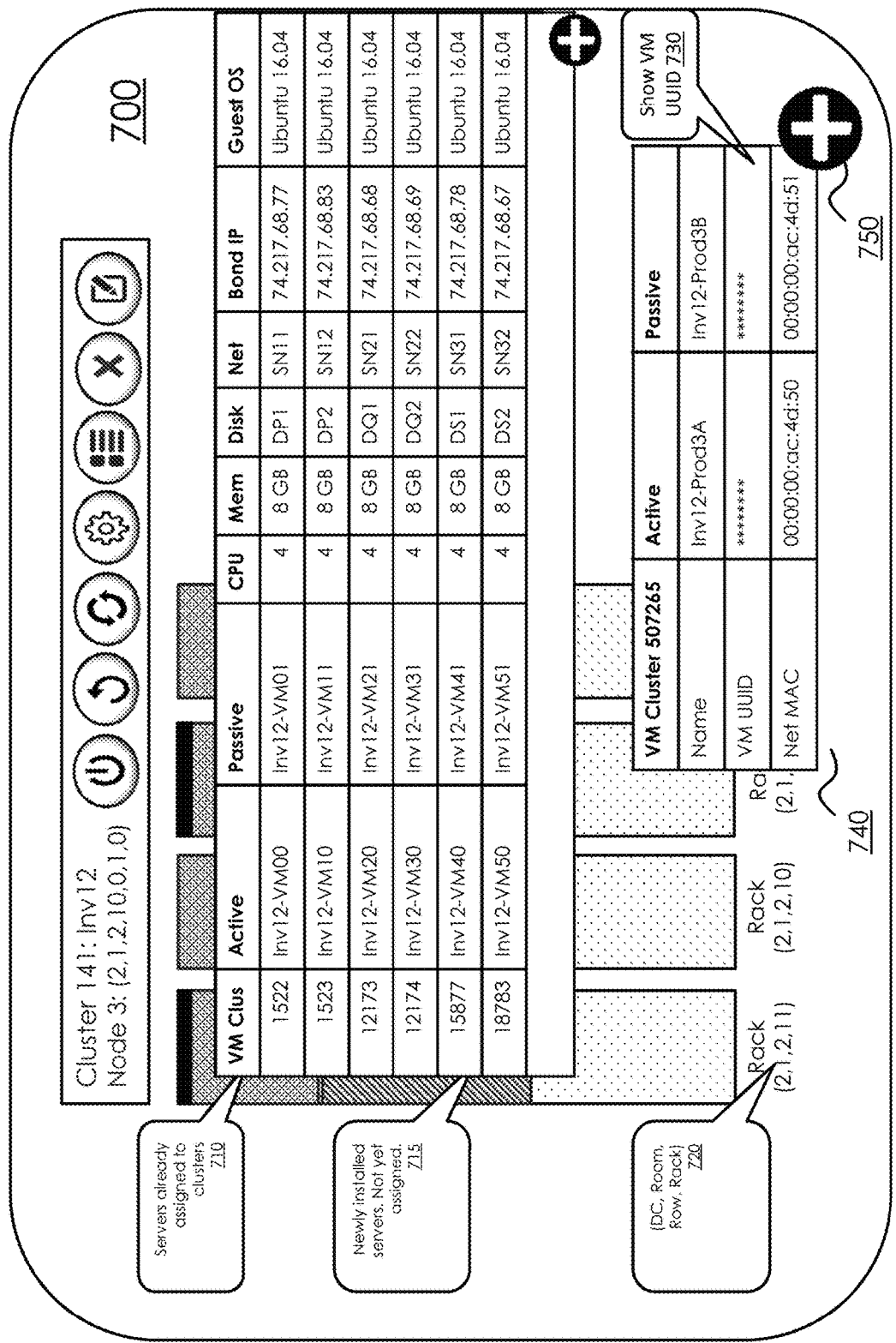
FIG. 7 illustrates an exemplary virtual machine cluster creation interface, according to one embodiment.

FIG. 7 illustrates an exemplary virtual machine cluster creation interface 700, according to one embodiment. TCM 115 presents a table 740 with a recommended configuration for the new virtual machine cluster (e.g., Cluster 507265), suggesting names, number of processors, amount of memory, storage and network interfaces to use, guest operating system to install, etc. If the administrator agrees with the recommendation, the new cluster is created by selecting an add button 750. Otherwise, he can make modifications to this information and then click the add button 750 to finalize the creation of the cluster.

Figure 8:
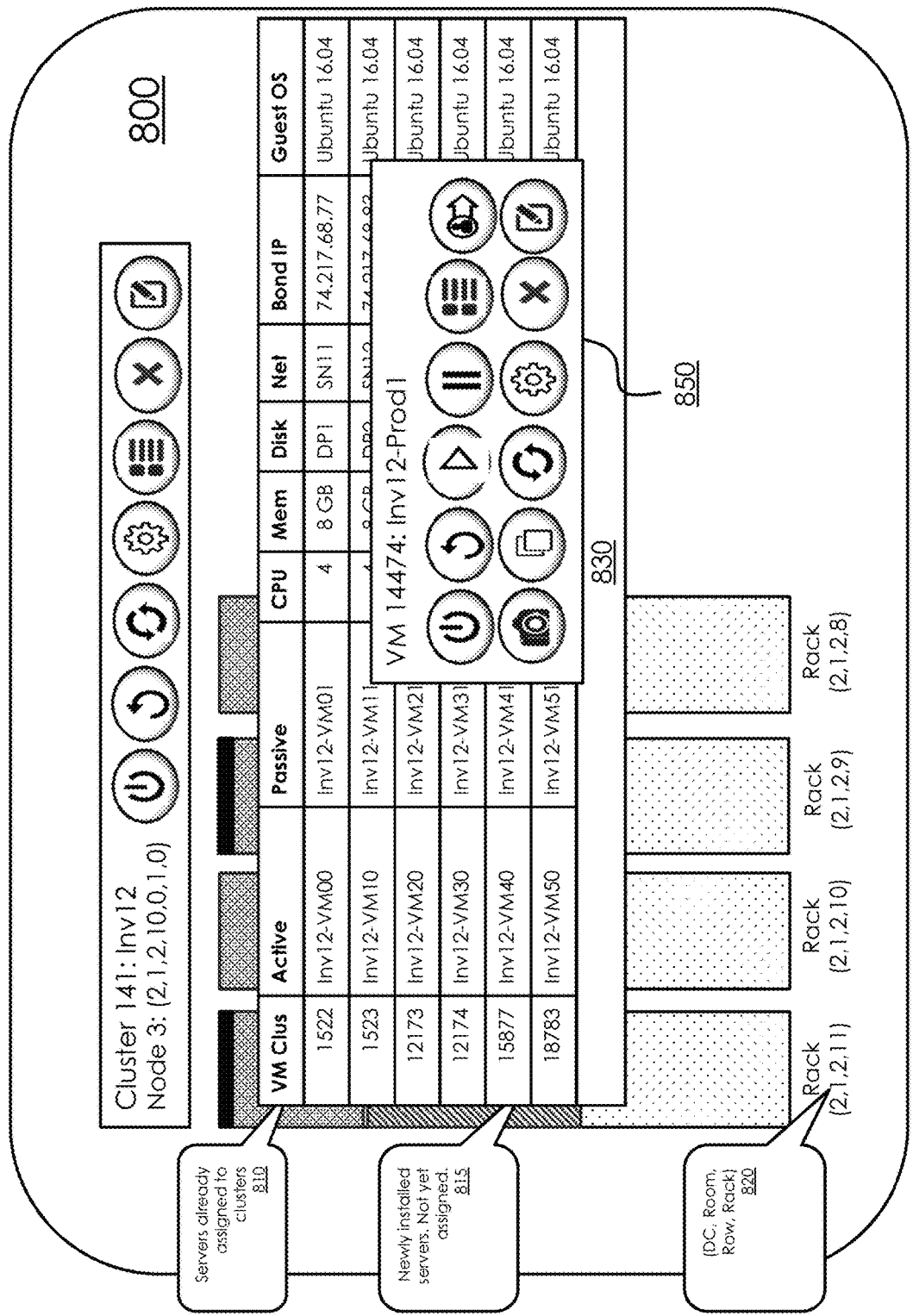
FIG. 8 illustrates an exemplary virtual machine cluster modification interface, according to one embodiment.

FIG. 8 illustrates an exemplary virtual machine cluster modification interface 800, according to one embodiment. To modify a virtual machine cluster, TCM 115 allows the administrator to select the desired cluster within table 830. TCM 115 displays a menu 850 that identifies the virtual machine cluster and buttons to perform various operations such as power on/off, reboot, suspend/resume, list details, live migration, snapshot, clone, software update, edit settings, delete the cluster, or edit configurations. Operations such as cloning and snapshotting automatically register the virtual machine images with the glance repository where it can be picked up as template to build future virtual machine clusters.

Storage

Figure 9:
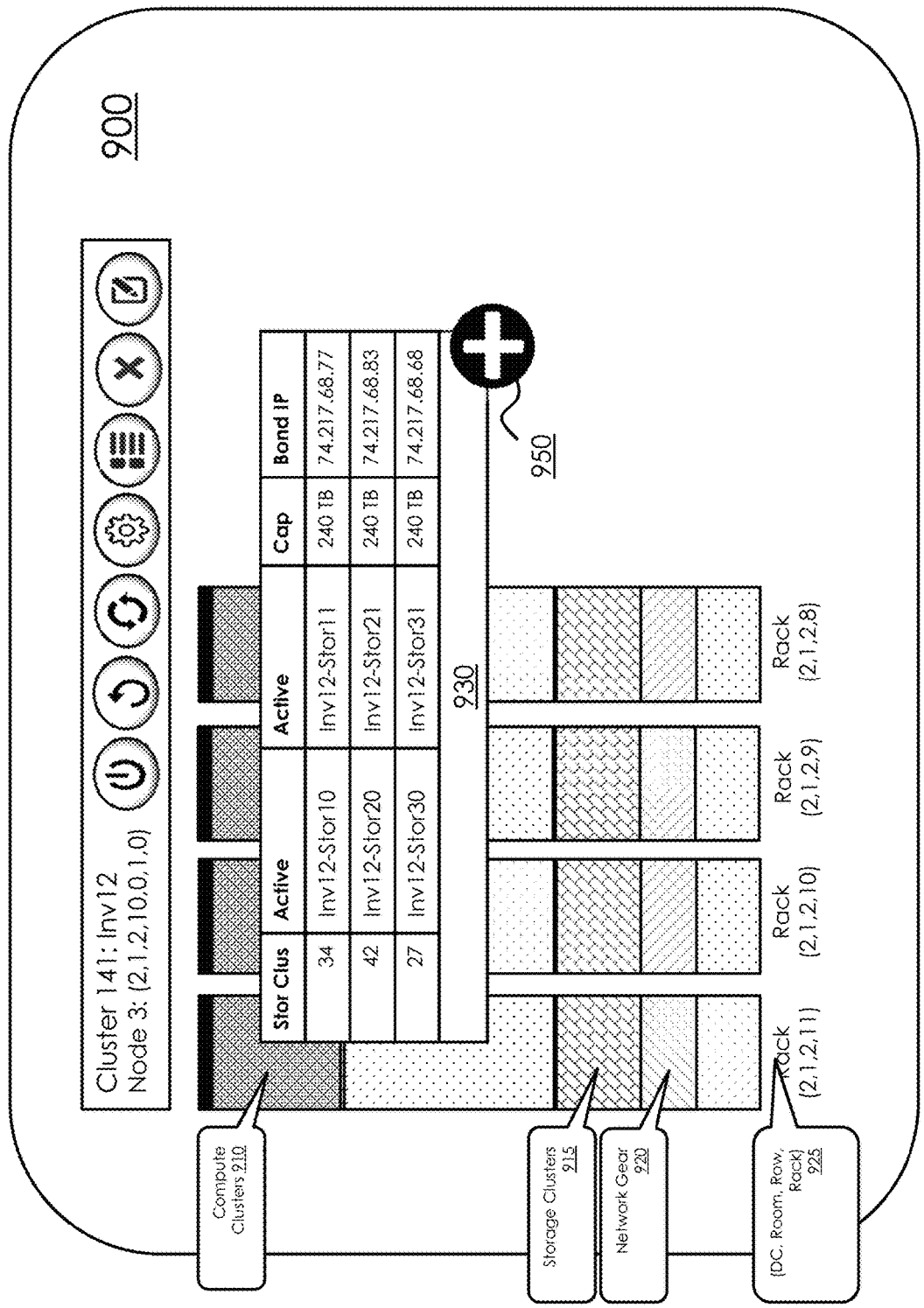
FIG. 9 illustrates an exemplary storage cluster interface, according to one embodiment.

FIG. 9 illustrates an exemplary storage cluster interface 900, according to one embodiment. TCM 115 may use cinder block storage for boot disk of virtual instances, and High Available Network File Systems (HA/NFS) for all application data volumes mounted in the virtual machine clusters (e.g., 124, 127 and 134, 137). The HA/NFS data volumes ensure that applications can be smoothly restarted when one virtual machine in the cluster goes down suddenly. It also is beneficial to help virtual machines in the cluster (e.g., 124, 127, 134, 137) efficiently operate on shared data when running in an active/active configuration. The cinder block devices reside on HA/NFS volumes managed by TCM storage manager.

According to one embodiment, TCM 115 creates and manages storage clusters—the configuration will include information on how many storage nodes to include in the high available storage clusters, how many are active (preferably all), and how many are passive, the bonded IP address to use to bind the storage volumes both in the storage (cinder) controller node as well as in the virtual instances. Storage cluster interface 900 appears when the storage widget of data center status interface 200 is selected. The administrator may directly land on the storage cluster page last viewed, or he may be navigated through the geographic locations view and data center view to land on the storage cluster interface 900 corresponding to the desired compute cluster (e.g., storage cluster 141 shown in storage cluster interface 900).

Figure 10:
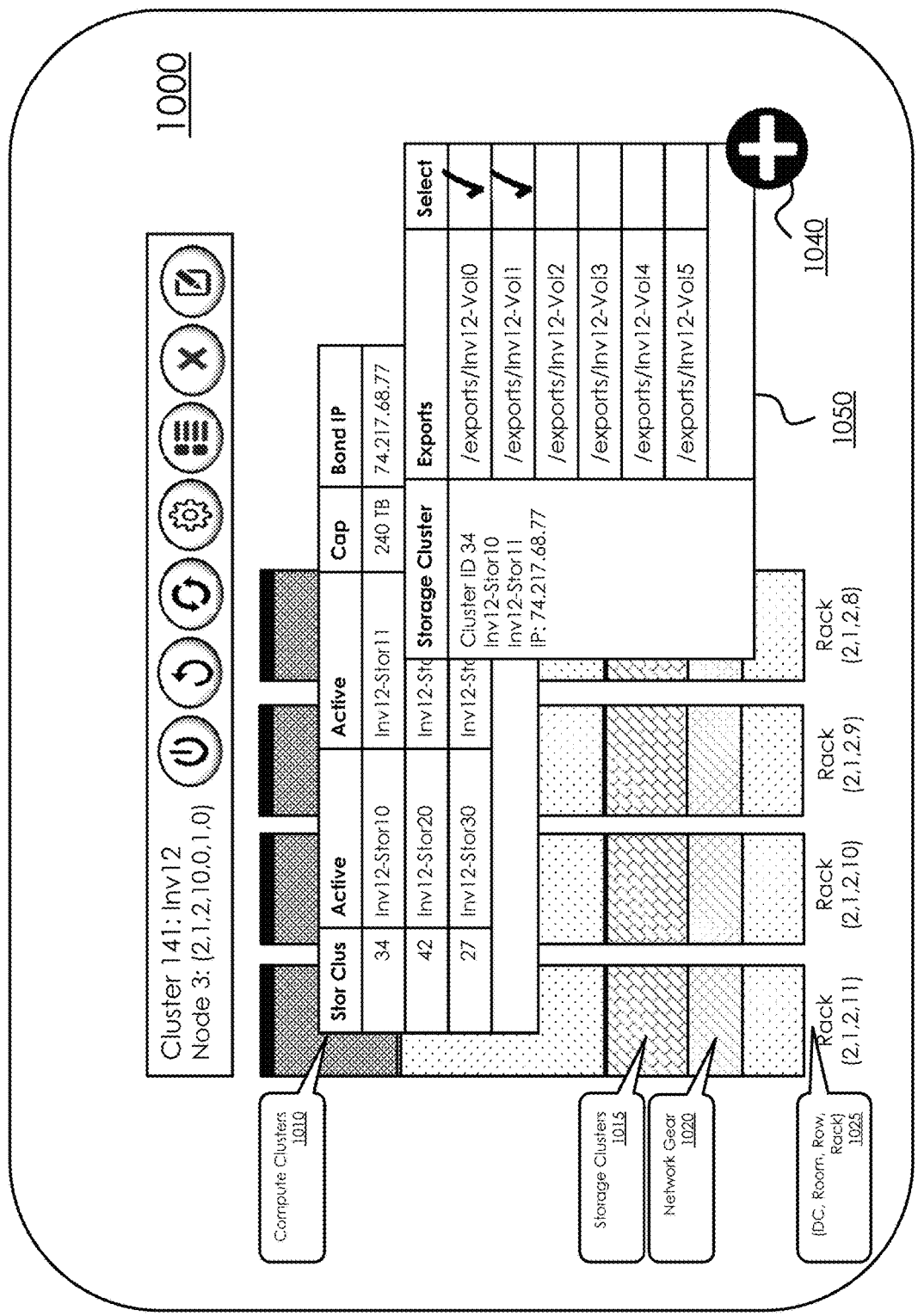
FIG. 10 illustrates an exemplary storage cluster configuration interface, according to one embodiment.

Within storage cluster interface 900, existing compute clusters may be selected and TCM 115 displays a list 930 of all the storage clusters (e.g., storage clusters 34, 42, and 27 of storage cluster interface 900) registered with an existing storage cluster (e.g., storage cluster 141). TCM 115 allows registration of a new storage cluster with the compute cluster by selecting the add button 950. FIG. 10 illustrates an exemplary storage cluster configuration interface 1000, according to one embodiment. TCM 115 displays a configuration table 1050 with a recommended configuration for a new storage cluster. An administrator can select the add button 1040 to finalize the creation of the storage cluster. According to another embodiment, TCM 115 allows the administrator to select a storage cluster to show the list of exported mount points. TCM 115 allows for selection of one or more mount points to register them with the compute cluster and click on the add button 1040 to complete the registration of these mount points.

Figure 11:
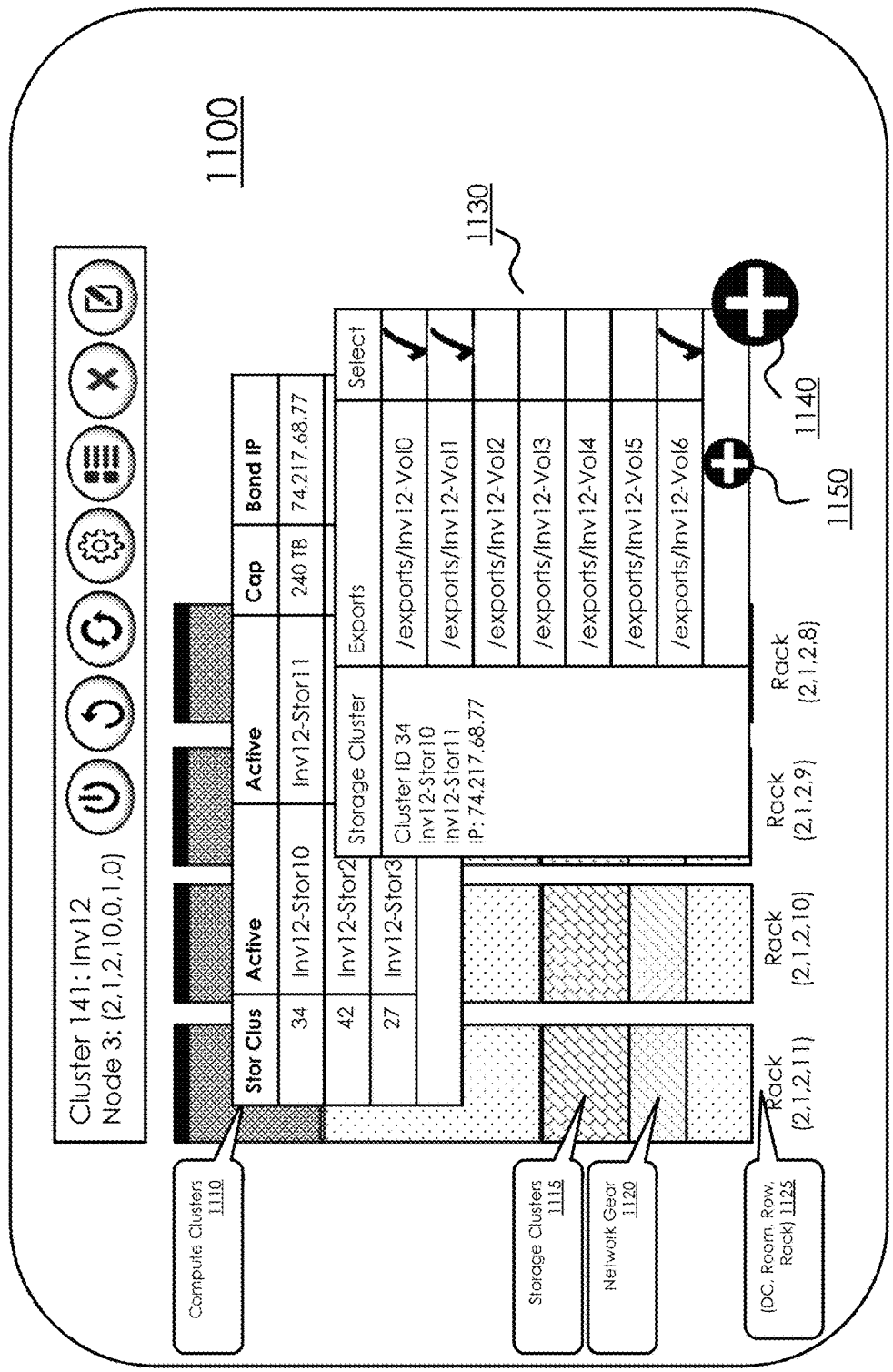
FIG. 11 illustrates an exemplary mount point creation interface, according to one embodiment.

FIG. 11 illustrates an exemplary mount point creation interface 1100, according to one embodiment. In another embodiment, TCM 115 allows selection of the add button 1150 at the bottom of the list of exported mount points 1130 to create one or more new mount points in the storage cluster. TCM 115 allows the finalization of the creation of the new mount points by clicking the add button 1140.

Network

Openstack based network configurations can get complicated. The present system 100 helps provide a base network configuration that can be simplified or enhanced based on the needs for the applications.

Figure 12:
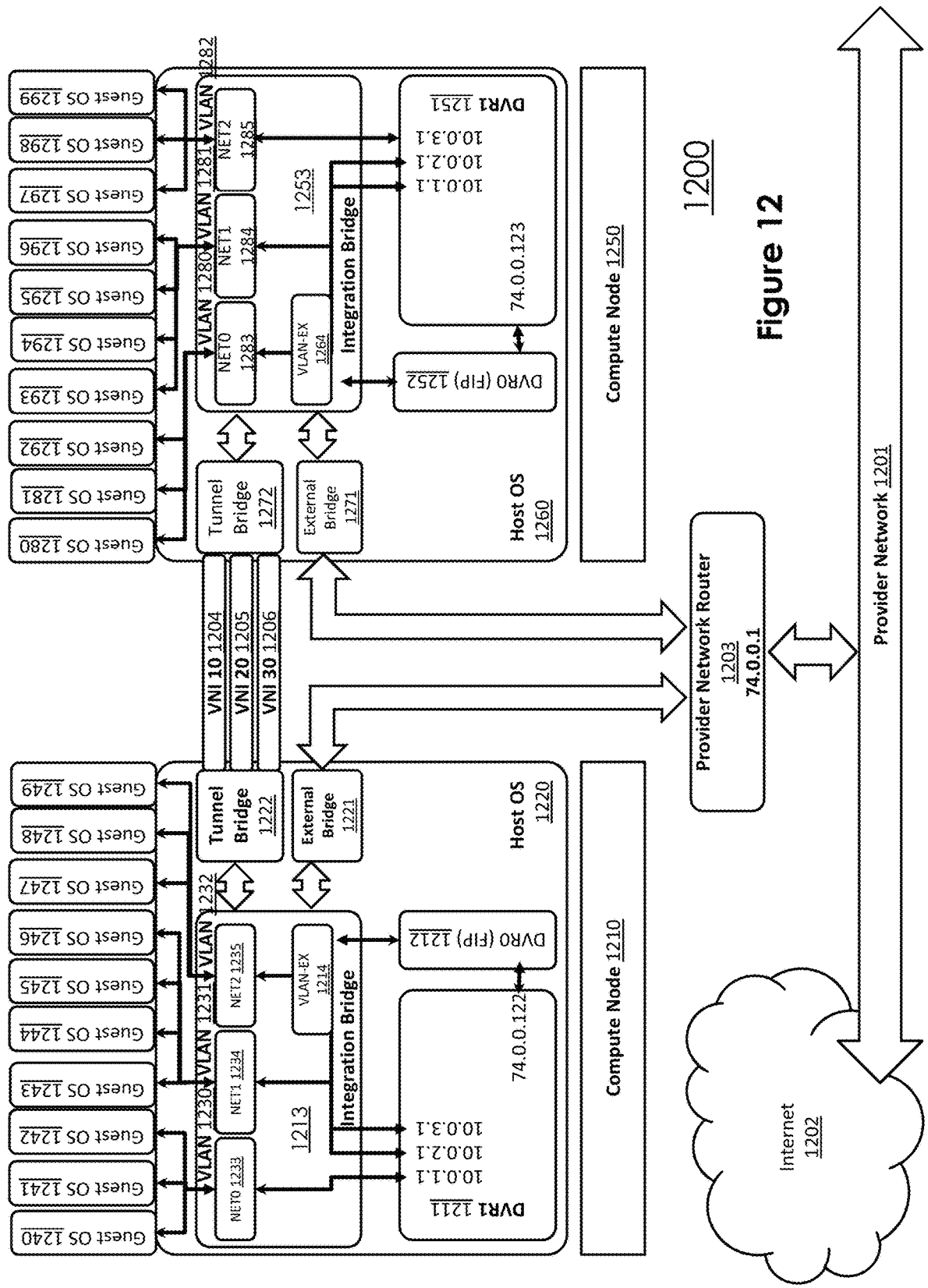
FIG. 12 illustrates a base network configuration, according to one embodiment.

FIG. 12 illustrates a base network configuration 1200, according to one embodiment. An external bridge 1221, 1271 connected to the provider network router 1203 serves floating IP addresses to internal dynamic virtual routers (DVRs), as well as the virtual instances. Connected to the external bridge is a cascade on DVRs 1211-1212, 1251-1252 which route data across three different networks or VLANs (NET0 (1233, 1283); NET1 (1234, 1284); and NET2 (1235, 1285)) on an integration bridge 1213, 1253 The networks or VLANs (1230-1232, 1280-1282) are the network interfaces through which the virtual instances communicate amongst themselves and to the outside world and to the internet 1202. The communications of virtual machines across hosts are further optimized for efficient routing via the use of dedicated VxLAN (virtual extensive local area network 1214, 1264) tunnels bound to a network (or VLAN) via its VNI (VxLAN network identifier 1204, 1205, 1206).

TCM 115 can create and manage the network 1200 configuration parameters, such as—
1. how many networks (akin to a VLAN—preferably one VLAN for each tenant on the cluster) and subnetworks (one subnet for each independent module of each tenant's application),
2. how the different distributed virtual routers (DVR) 1211, 1212, 1251, 1252, are configured to connect the VLANs 1230-1232, 1280-1282, to the integration bridges 1213, 1253, how the tunnel bridges are configured for efficient routing and QoS via software defined networking (SDN), and
3. how the external bridge and consequently the internal VLANs and virtual instances are configured to operate on floating IP addresses, etc.

Figure 13:
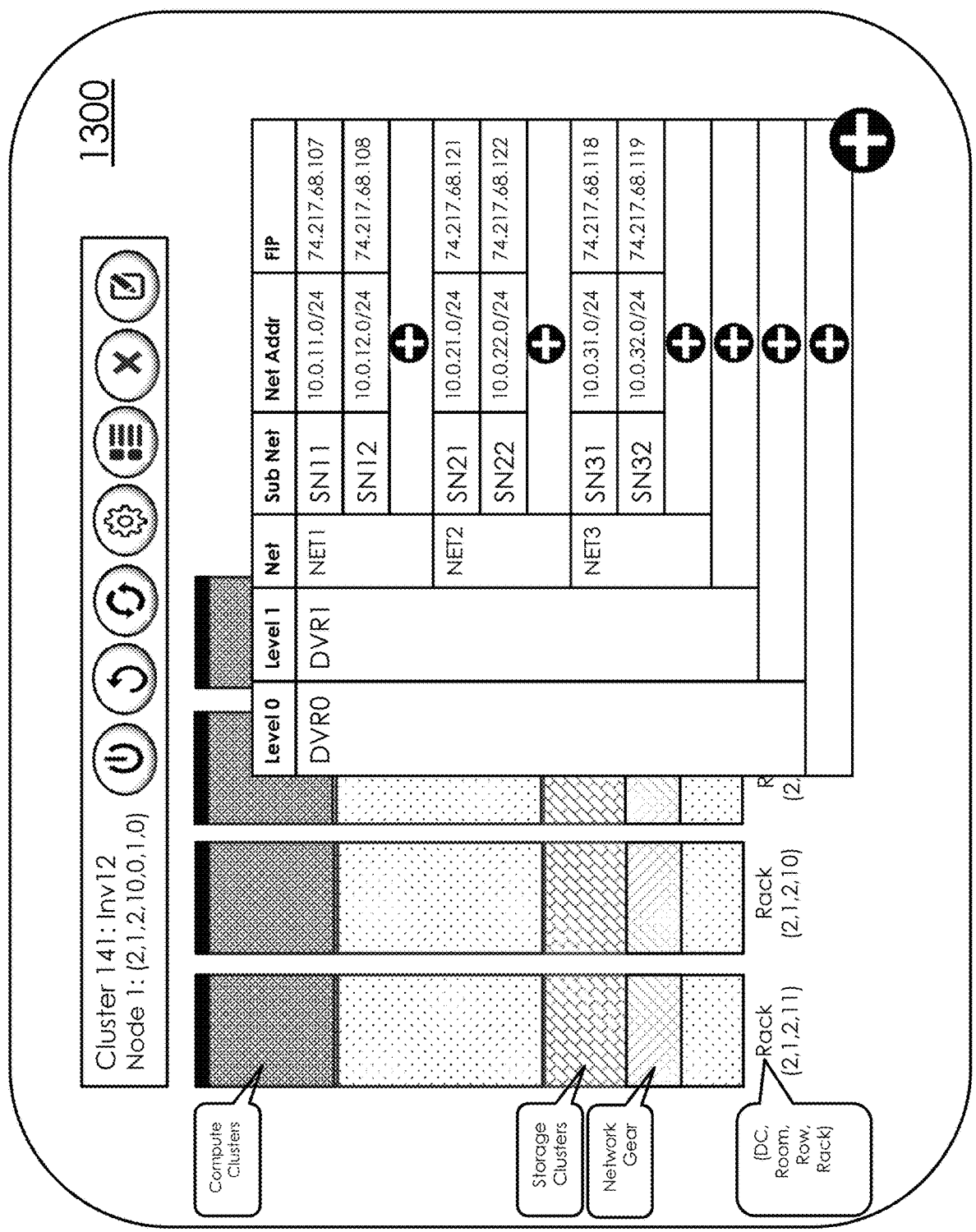
FIG. 13 illustrates an exemplary network interface, according to one embodiment.

FIG. 13 illustrates an exemplary network interface 1300, according to one embodiment. TCM 115 presents a network interface 1300 upon selection of the network widget on data center status interface 200. The network view that had last been open may be shown by TCM 115. According to another embodiment, TCM 115 presents interfaces to navigate through the geo locations view and data center view to land on the network interface 1300 for the desired compute cluster.

From network interface 1300, TCM 115 allows for the selection of a compute cluster (e.g., cluster 141 shown in network interface 1300) to edit configurations of the network.

In the present system, every entity is a project which can be speculatively created, executed atomically, and "committed" or "rolled back" atomically. TCM 115 permits projects to be created via click-ahead operations by creating a list of transactions that will be executed to complete the operations, rather than performing the transactions instantaneously. Thus, TCM 115 creates large projects online very fast and executes the projects offline over many minutes, hours, or days. TCM 115 executes projects using persistent transactions such that even if there are initial failures the system administrators can enter the transaction and fix problems incrementally, while still retaining the ability to ensure atomicity of the project when it is finally committed.

Figure 20:
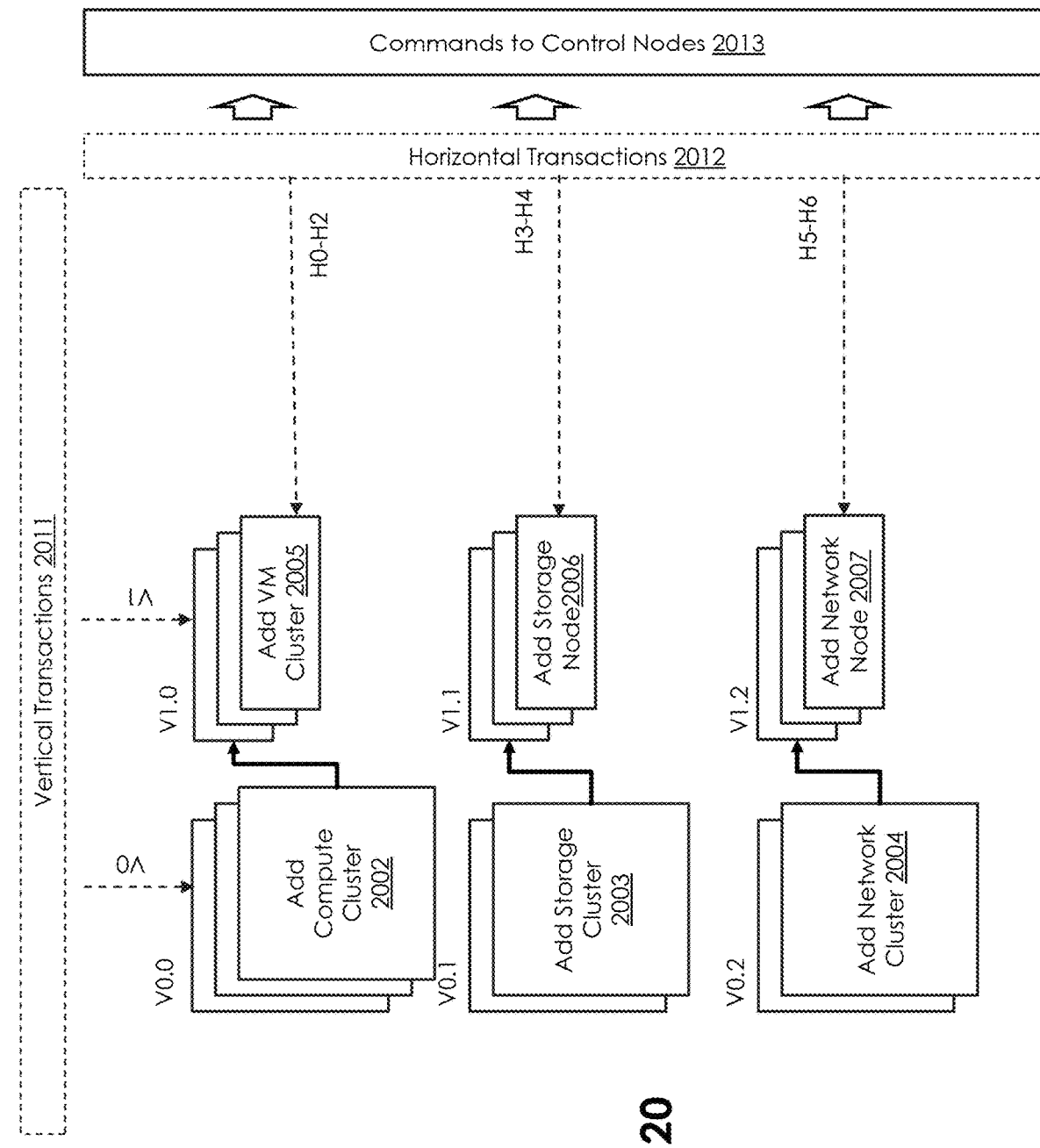
FIG. 20 illustrates an exemplary process for the creation of a project, according to one embodiment.
Figure 21:
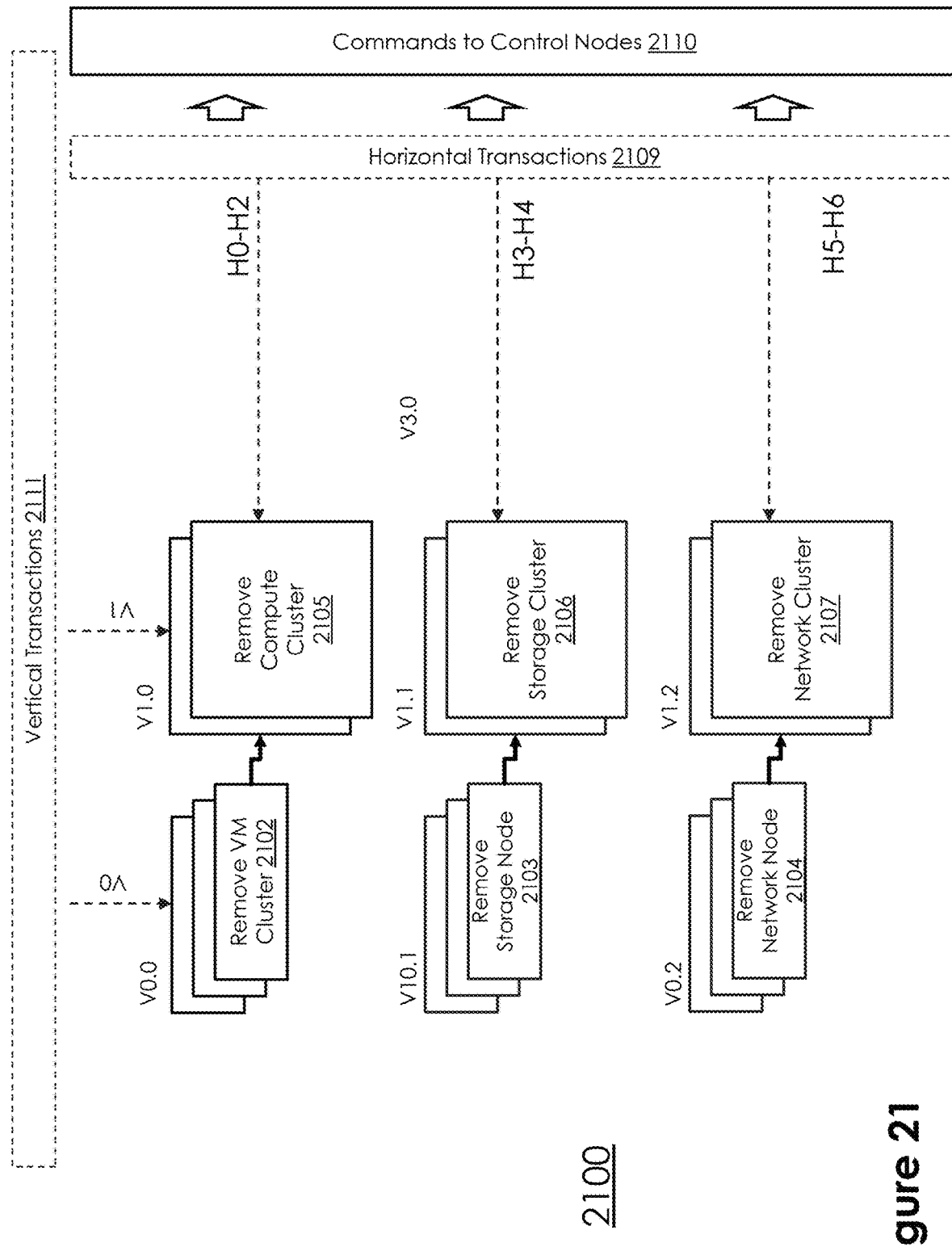
FIG. 21 illustrates an exemplary process for the removal of a project, according to one embodiment.

A project involves the configuration and management multiple compute clusters, storage clusters, and network clusters. FIG. 20 illustrates an exemplary process 2000 for the creation of a project, according to one embodiment. FIG. 20 illustrates the transactional (atomic) addition of the project. FIG. 21 illustrates an exemplary process 2100 for the removal of a project, according to one embodiment. FIG. 21 illustrates the transactional (atomic) removal of the project.

Figure 22:
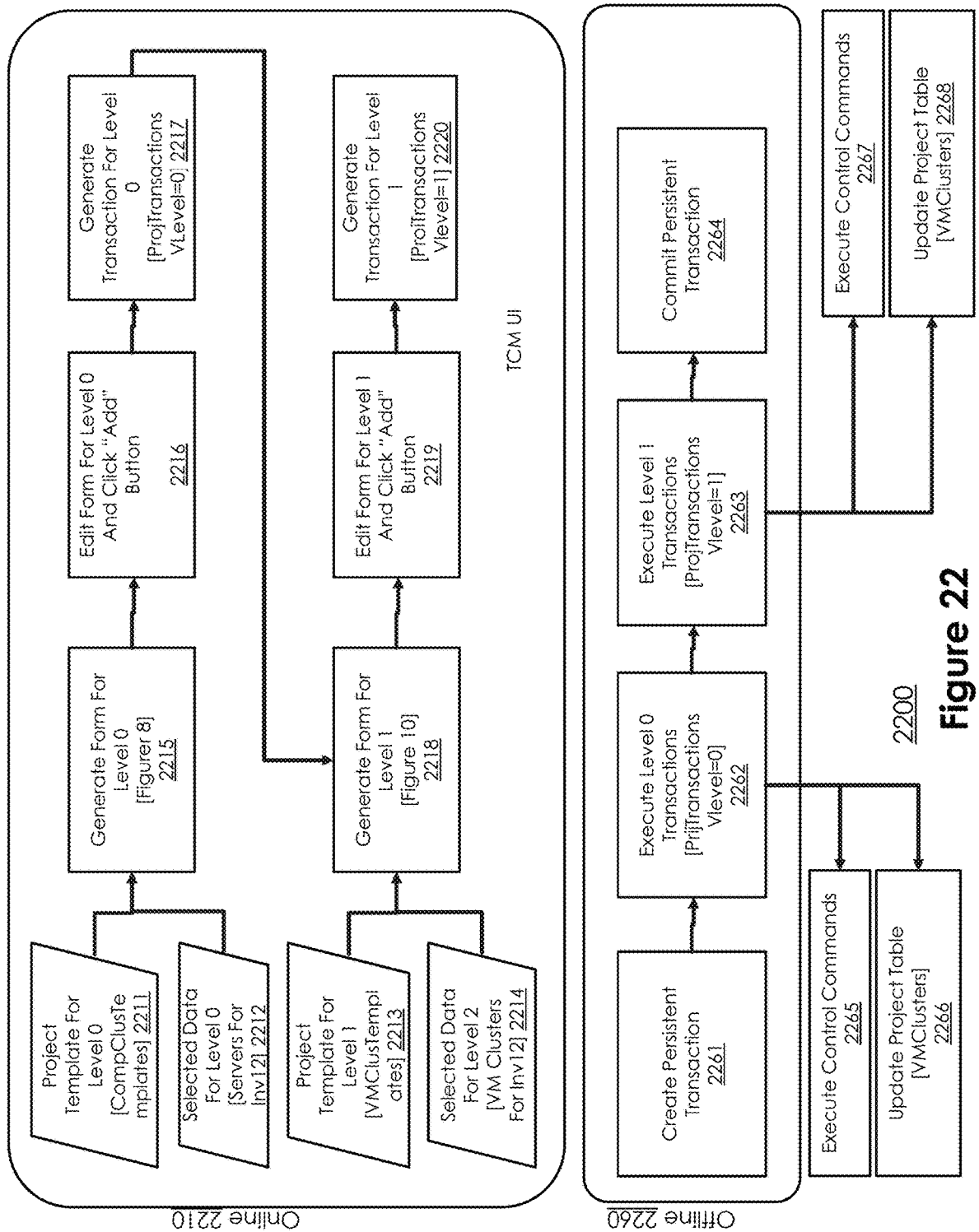
FIG. 22 illustrates a life cycle process for a project, according to one embodiment.

FIG. 22 illustrates a life cycle process 2200 for a project, according to one embodiment. For the creation of compute clusters and VM clusters, a project is created or removed in a persistent transaction according to process 2200—however the persistent transaction includes multiple transactions classified as vertical and horizontal transactions. Vertical transactions are traditional transactions at a level—each transaction in a vertical transaction can be executed asynchronously in parallel (because they are independent and autonomous in their behavior). There is, however, a hierarchical dependency of vertical transactions at a particular level to vertical transactions at its parent level (lower level). Horizontal transactions can be committed in one mass. Not all horizontal transactions need to be completed for a particular horizontal transaction to be committed. The horizontal transactions may be committed only within the persistent transaction. According to one embodiment, each horizontal transaction as a nested persistent transaction within the outermost parent persistent partition. The partial commit of the horizontal transactions helps build global visibility of all database components belonging to transactions that have successfully completed hitherto.

As shown in FIG. 20, vertical transactions 2011 at level 0 (V0) are the transactions that create multiple compute clusters 2002 (e.g., compute clusters 120, 130), those that create multiple storage clusters 2003 (e.g., storage clusters 160, 170), and those that create multiple network clusters 2004 (e.g., network controller cluster 140). The vertical transactions 2011 at level 1 (V1) are the transactions that build the VM clusters 2005 (for compute clusters), those that create the storage nodes 2006 (for storage clusters), and those that create network nodes 2007 (for network clusters). One horizontal transaction 2012 may be the creation of a compute cluster (e.g., compute clusters 120, 130), and all VM clusters associated with it. Another horizontal transaction 2012 may be the creation of a storage cluster (e.g., storage clusters 160, 170), and all storage nodes associated with it. Similarly yet another horizontal transaction 2012 may be the creation of a network cluster (e.g., network controller cluster 140) and all network nodes associated with it.

Figure 14:
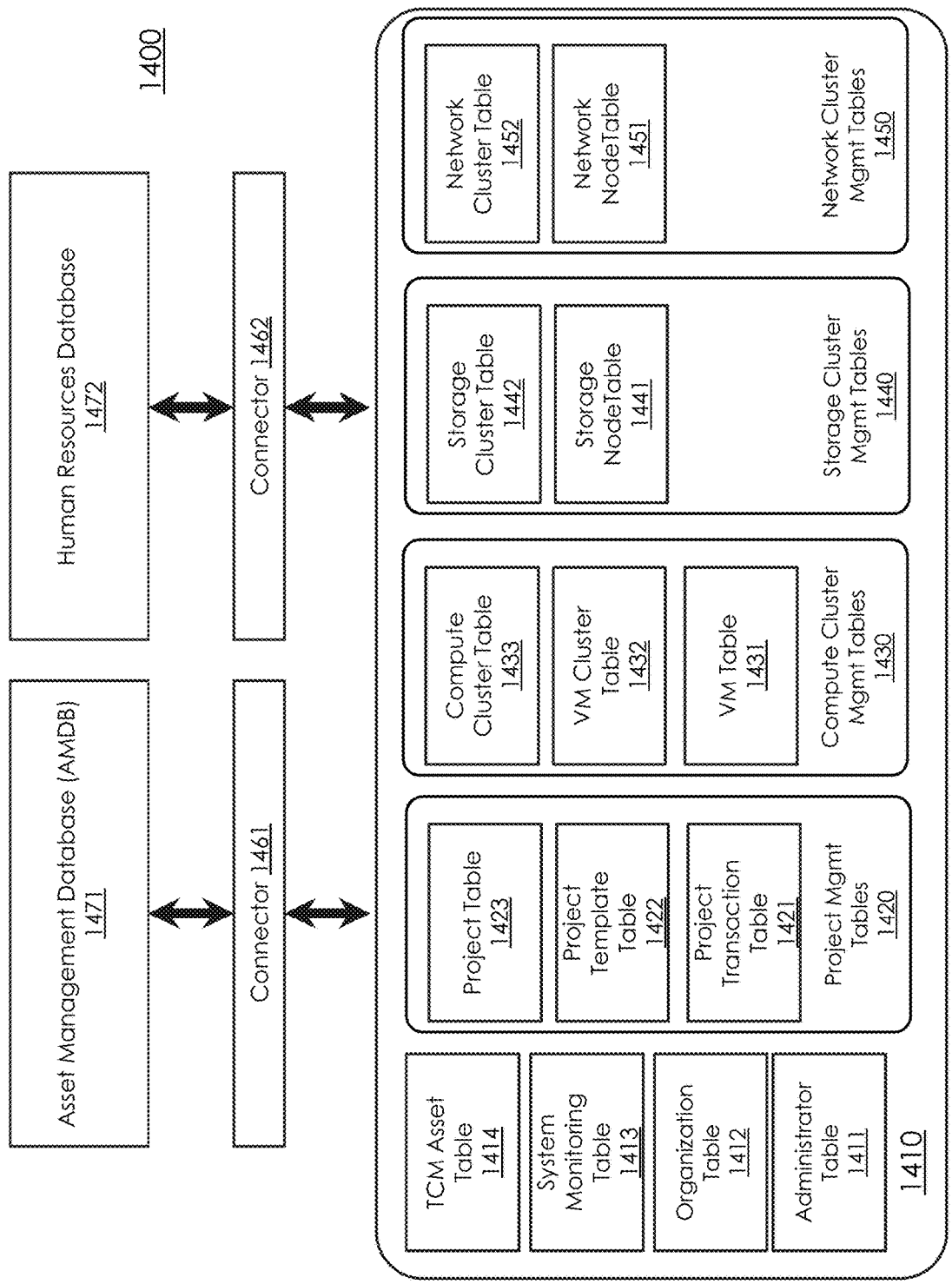
FIG. 14 illustrates an exemplary TCM database architecture, according to one embodiment.
Figure 16:
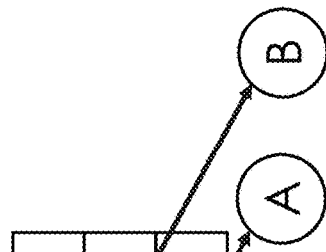
FIG. 16 illustrates an exemplary TCM database architecture, according to one embodiment.

FIG. 14 illustrates an exemplary TCM database architecture 1400, according to one embodiment. TCM database 1400 collaborates with external databases, such as asset management databases (AMDB) 1471 and human resources databases (HRDB) 1472. TCM connectors 1461 and 1462 enable seamless communication via API's to AMDB 1471 and HRDB 1472. FIG. 15 illustrates and exemplary asset management database 1500, according to one embodiment. The TCM Asset Table 1414 (also shown in more detail in FIG. 16) provides extensions to an asset database. FIG. 16 illustrates an exemplary TCM database architecture 1600, according to one embodiment. TCM database 1600 includes TCM asset table database 1610 that has GPS co-ordinates of each rack/server ("GPS#") (used to create the room-view as explained above), the identification for (IoT) tracker devices associated with each server ("Tracker#"), the IP addresses for the system monitoring agents in each of the servers ("SysMonAddr"), etc.

Returning to FIG. 14, system monitoring table 1413 collects periodic statistics from various physical and virtual servers and keeps the summary statistics for CPU, memory, storage, and network usages, as shown in system monitoring table 1640. The organization table 1412 (detailed in administrator table 1620) is the bridge between TCM 115 and HRDB 1472 to show the organization and contact details for each project. The administrator table 1411 (detailed in administrator table 1630) primarily identifying the roles and credentials of employees authorized to work on TCM administration. Database architecture 1400 includes three sets of tables for the management of compute clusters 1430, storage clusters 1440, and network clusters 1450. The principles employed for compute clusters described herein, can be generically applied to accomplish the operations on storage and network clusters as well.

The lifecycle of a project begins with the creation of an entry in the project table 1423 (detailed in project table 1650). P0 is the project for a compute, storage, and network cluster administered by employee with id 11789. FIG. 17 illustrates an exemplary project template database, according to one embodiment. There are two parts to this project—a key (TEMP-P0) to the Project Templates (ProjTemplates) table 1710 entry, and a key (TRAN-P0) to the Project Transactions (ProjTransactions) table 1800 as illustrated in FIG. 18. FIG. 18 illustrates an exemplary project transaction table 1800, according to one embodiment. The lifecycle of the project P0 progresses through the following three steps.

Step one is the completion of the project template, TEMP-P0, where the administrator specifies the templates for creating compute clusters and VM clusters 2211. The specification of the compute cluster template 1730 is a wildcard for the host name (where "% C %" will be replaced by the name of the cluster derived from the name of the project—"Inv12", "Inv13", etc. are names TCM 115 assigns to cluster names, "% N %" is the number of the next server subcluster, and "% M %" is the mirror id—0 or 1), the default number of nodes in the cluster (4), the number of mirrors (active/active—2), maximum number of VM clusters (6), and the Host OS (RHEL 7.0). The specification of the VM cluster template 1740 is a wildcard for the VM names (where "% C %", "% N %", and "% M %" have the same semantics as in the case of host names above), the number of mirrors (active/passive—2), the number of virtual CPUs (4), the size of virtual RAM in GB (8), the guest OS (Ubuntu 16.04). These can be added via SQL queries or via forms (not shown in this illustration).

Step two onwards is explained in FIG. 22. It starts with the generation of the form for Level 0 of compute cluster creation (FIG. 4). To do so the administrator clicks on a set of servers that are installed but not clustered—TCM advises the number of servers to be selected for clustering based on the number of nodes specified in template specified in TEMP-P0. TCM generates a form with information derived from the TCM asset table 1414 and the specifications from the template, TEMP-P0. The administrator can make any modifications whatsoever to the form and press the "Add" button to accept the configuration. At this time, the transaction records for level 0 (compute cluster) are added in the ProjTransactions table 1421 in FIG. 14. TCM 115 then proceeds to generate form for the VM clusters (FIG. 6) based on the specifications in the TEMP-P0 template. The administrator can make modifications and press the "Add" button to accept the configuration. The transaction records for level 1 (VM cluster) are added to ProjTransactions table 1820 in FIG. 18. The transaction records in ProjTransactions table 1820 include the type of transaction, the HLevel (horizontal level) and VLevel (vertical level) for the transaction, and the name of a shell script which sends commands over the control network to create the compute/VM clusters on the remote server as well as create a (transient) transaction to update the Project tables (CompClusters and VMClusters) shown in FIG. 19. FIG. 19 illustrates an exemplary project transaction database, according to one embodiment.

Returning to FIG. 22, step three creates a persistent transaction and running the vertical transactions for level 0 (2217) followed by the vertical transactions for level 1 (2213, 2214, 2218, 2219, 2220). The execution of these transactions is effected by running the appropriate shell scripts in ProjTransactions table ("<script> create" will create the project atomically and "<script> remove" will remove the project atomically). The execution of this script involves (a) sending a command over the control network to the remote node to perform the compute/VM cluster operations, and (b) creating a (transient) transaction to update the Project tables (CompClusters and VMClusters). Once all vertical transactions complete the persistent transaction is committed 2264. Otherwise, (a) TCM will make an attempt to diagnose the failed transactions and take corrective actions, or (b) the administrator can enter the persistent transaction (by name) and make fixes and incremental run only the failed transactions. If all goes well, the results can be committed.

While the present disclosure has been described in terms of particular embodiments and applications, summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A system, comprising: a transactional cloud manager;
a compute cluster connected to the transactional cloud manager, the compute cluster including a system monitor and a control manager in a host; and
a virtual machine running on the host, wherein the virtual machine has a VM system monitor and a VM control manager; wherein the transactional cloud manager creates virtual machine clusters on the host,
wherein the transactional cloud manager provides predictive resource management for anticipating speculative resource allocation based on statistics stored in an asset management database; and
wherein the transactional cloud manager provides a user interface showing a geographical location of the compute cluster, wherein the geographic location is based upon GPS coordinates for the compute cluster stored in an asset table.

2. The system of claim 1, wherein the VM system monitor collects statistics related to the virtual machine and the system monitor collects statistics related to the host.

3. The system of claim 1, further comprising a controller cluster and a storage cluster.

4. The system of claim 3, wherein the transactional cloud manager creates a cluster using a project template, the project template facilitates completion of offline tasks to create multiple compute nodes in the compute cluster, wherein the offline tasks do not require interaction with an administrator.

5. The system of claim 4, wherein the transactional cloud manager provides suggested configurations for the cluster that the transactional cloud manager implements upon receiving a confirmation from the administrator.

6. The system of claim 4, wherein the cluster is one of the compute cluster, the storage cluster or the controller cluster.

7. The system of claim 5, wherein the suggested configurations use the project template that is customized for the administrator.

8. The system of claim 3, further comprising a data network, a control network and a monitoring network.

9. The system of claim 8, wherein the control network is a peer-to-peer network that interconnects the VM system monitor, the system monitor and the transactional cloud manager.

10. The system of claim 9, further comprising a controller system monitor running on the controller cluster that is interconnected to the control network.

11. The system of claim 8, further comprising a storage network interconnecting the storage cluster to the controller cluster.

12. The system of claim 1, wherein the user interface includes a view of a room within a data center where the compute cluster is located and identifies the geographic location of the compute cluster in the room.

13. The system of claim 1, wherein the user interface includes a view of counters for data centers, rooms, servers, hosts, clusters, virtual machines, and storage.

14. The system of claim 1, wherein the user interface includes a view of alerts and notifications.

15. The system of claim 1, wherein the user interface includes a view of inventory of hardware, hosts and guests.

16. The system of claim 1, wherein the user interface includes a view of statistics of CPU, memory, storage and network performance.

17. The system of claim 1, wherein the user interface includes a histogram of CPU, memory, storage and network usage.

* * * * *